(12) United States Patent
Fukurono et al.

(10) Patent No.: US 9,120,460 B2
(45) Date of Patent: Sep. 1, 2015

(54) FRONT PASSENGER SEAT AIRBAG APPARATUS

(71) Applicant: TOYODA GOSEI CO., LTD., Kiyosu-shi, Aichi-ken (JP)

(72) Inventors: Kenichi Fukurono, Kiyosu (JP); Mikine Hayashi, Kiyosu (JP); Takanori Komatsu, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 14/296,750

(22) Filed: Jun. 5, 2014

(65) Prior Publication Data

US 2015/0001835 A1    Jan. 1, 2015

(30) Foreign Application Priority Data

Jun. 28, 2013 (JP) ................................ 2013-136653

(51) Int. Cl.
*B60R 21/26* (2011.01)
*B60R 21/233* (2006.01)
*B60R 21/239* (2006.01)

(52) U.S. Cl.
CPC .............. *B60R 21/26* (2013.01); *B60R 21/233* (2013.01); *B60R 21/239* (2013.01); *B60R 2021/2395* (2013.01); *B60R 2021/23324* (2013.01); *B60R 2021/26094* (2013.01)

(58) Field of Classification Search
CPC .......... B60R 2021/26094; B60R 2021/23324; B60R 21/26; B60R 21/239; B60R 21/233; B60R 2021/2395
USPC ....................................................... 280/729
See application file for complete search history.

(56) References Cited

U.S. PATENT DOCUMENTS

| 3,937,258 | A | * | 2/1976 | Loomba ........................ 141/67 |
| 5,219,179 | A | * | 6/1993 | Eyrainer et al. ............. 280/739 |
| 5,718,450 | A | * | 2/1998 | Hurford et al. ............ 280/730.2 |
| 7,134,691 | B2 | * | 11/2006 | Dunkle et al. ............. 280/743.2 |
| 7,654,561 | B2 | * | 2/2010 | Webber et al. ............... 280/729 |
| 2003/0020268 | A1 | * | 1/2003 | Reiter et al. ................. 280/742 |
| 2010/0001495 | A1 | * | 1/2010 | Sekino et al. ................ 280/729 |
| 2012/0112441 | A1 | * | 5/2012 | Ohara .......................... 280/729 |
| 2014/0265278 | A1 | * | 9/2014 | Anderson et al. .......... 280/743.1 |

FOREIGN PATENT DOCUMENTS

JP       2007-161089 A      6/2007

* cited by examiner

*Primary Examiner* — Paul N Dickson
*Assistant Examiner* — Timothy Wilhelm
(74) *Attorney, Agent, or Firm* — Posz Law Group, PLC

(57) ABSTRACT

In a front passenger seat airbag apparatus, a partition wall portion is disposed in an airbag to partition the inside of the airbag into a front chamber and a rear chamber. The entire outer circumferential edge of the partition wall portion is jointed with an outer circumferential wall of the airbag, and the partition wall portion includes a communication portion for communication between the front chamber and the rear chamber. The communication portion includes a flow rate control mechanism that controls a flow rate of inflation gas flowing from the front chamber into the rear chamber by increasing or decreasing an opening area of the communication portion. The flow rate control mechanism is configured to suppress flow of the inflation gas into the rear chamber via the communication portion at initial inflation of the airbag in such a manner that the front chamber is inflated, and is configured to open the communication portion in such a manner that the inflation gas flows into the rear chamber by an internal pressure of the front chamber.

5 Claims, 13 Drawing Sheets

A-A part enlarged cross section

B-B part enlarged cross section

FRONT PASSENGER SEAT AIRBAG APPARATUS

CROSS REFERENCE TO RELATED APPLICATIONS

The Present application claims priority from Japanese Patent Application No. 2013-136653 of Fukurono et al., filed on Jun. 28, 2013, the disclosure of which is hereby incorporated into the present application by reference.

BACKGROUND OF THE INVENTION

1. Field of the Invention

The present invention relates to a front passenger seat airbag apparatus that includes an airbag which is accommodated in a folded state in an accommodating portion disposed in an instrument panel in front of a front passenger seat of a vehicle, and an inflator which supplies inflation gas to the airbag.

2. Description of Related Art

In the related art, there is a front passenger seat airbag apparatus with a configuration disclosed in JP-A-2007-161089. The front passenger seat airbag apparatus of the related art includes an airbag into which inflation gas is discharged from an inflator flows, and thus which is deployed and inflated so as to protrude from an accommodating portion toward a rear side of a vehicle. A membrane is disposed in the airbag to partition an inner region of the airbag in a front and rear direction into a front chamber and a rear chamber at complete inflation of the airbag. A vent hole is provided in the membrane for communication between the front chamber and the rear chamber.

In the front passenger seat airbag apparatus of the related art, the membrane partitions the inside of the airbag in the front and rear direction so as to inflate the front chamber firstly. However, the vent hole formed in the membrane is formed by cutting out a part of the membrane, and the vent hole is open all the time. For this reason, a flow rate of the inflation gas flowing from the front chamber into the rear chamber via the vent hole is substantially constant from initial inflation to complete inflation of the airbag. As a result, when an opening area of the vent hole is small, the front chamber can be quickly inflated. However, the inflation of the rear chamber is delayed compared to the front chamber, and thus an occupant is not protected immediately. In contrast, when the opening area of the vent hole is large, the inflation gas is not prevented from flowing into the rear chamber via the vent hole at the substantially same time when the inflation of the front chamber starts. For this reason, in a case where the opening area of the vent hole is large, when the inflation gas flows into the rear chamber, the entire airbag is deployed to greatly protrude toward the occupant, and thus the entire airbag oscillates considerably in the front and rear direction. Accordingly, there is room for improvement in the way that the inflation of the airbag is completed so as to be able to immediately protect the occupant.

SUMMARY OF THE INVENTION

An object of the present invention is to provide a front passenger seat airbag apparatus in which inflation of an airbag can be quickly completed, and an occupant can be stably protected.

The object of the present invention can be obtained by the front passenger seat airbag apparatus with the following configuration.

According to an aspect of the present invention, there is provided a front passenger seat airbag apparatus includes an airbag that is accommodated in a folded state in an accommodating portion disposed in an instrument panel in front of a front passenger seat of a vehicle; and an inflator that supplies inflation gas to the airbag. The airbag has a configuration in which a front-end side of the airbag is attached to the accommodating portion at complete inflation, the inflation gas discharged from the inflator flows into the airbag; and thus the airbag is deployed and inflated to protrude from the accommodating portion toward a rear side of the vehicle, and a partition wall portion is disposed in the airbag to partition an inner region of the airbag into a front chamber and a rear chamber at the complete inflation of the airbag. An entire outer circumferential edge of the partition wall portion is jointed with an outer circumferential wall of the airbag, and the partition wall portion includes a communication portion for communication between the front chamber and the rear chamber. The front chamber includes a supported portion supported by a portion which becomes a circumferential edge of the accommodating portion of the instrument panel at the complete inflation of the airbag. The communication portion includes a flow rate control mechanism that controls a flow rate of the inflation gas flowing from the front chamber into the rear chamber by increasing or decreasing an opening area of the communication portion. The flow rate control mechanism is configured to suppress flow of the inflation gas into the rear chamber via the communication portion at initial inflation of the airbag in such a manner that the front chamber is inflated, and is configured to open the communication portion in such a manner that the inflation gas flows into the rear chamber by an internal pressure of the front chamber.

In the front passenger seat airbag apparatus according to the aspect of the present invention, the communication portion formed in the partition wall portion includes the flow rate control mechanism that controls a flow rate of the inflation gas flowing from the front chamber into the rear chamber. The flow rate control mechanism is configured to suppress the flow of the inflation gas into the rear chamber via the communication portion at the initial inflation of the airbag. For this reason, first, the inflation gas discharged from the inflator flows into the front chamber at the initial inflation of the airbag, and thus the front chamber is quickly inflated. After the front chamber is inflated, the communication portion is opened, and the inflation gas flows into the rear chamber via the communication portion to inflate the rear chamber. The flow rate control mechanism can increase or decrease an opening area of the communication portion. Specifically, when the inflation gas flows into the rear chamber, and thus an internal pressure of the front chamber decreases, the flow rate control mechanism can suppress a flow rate of the inflation gas flowing into the rear chamber by decreasing the opening area of the communication portion, and the internal pressure of the front chamber can be prevented from greatly decreasing. For this reason, even when the inflation gas flows into the rear chamber, the front chamber maintains the inflated shape. Furthermore, the front chamber includes the supported portion supported by the portion which becomes the circumferential edge of the accommodating portion of the instrument panel at the complete inflation of the airbag.

That is, in the front passenger seat airbag apparatus according to the aspect of the present invention, first, the inflation gas flows into the front chamber attached to the accommodating portion to quickly inflate the front chamber. Even though the rear chamber is inflated when the communication portion is opened, the inflated state of the front chamber is maintained. For this reason, the supported portion formed on the front chamber is supported by the portion which becomes the circumferential edge of the accommodating portion of the instrument panel at the inflation of the rear chamber. As a result, even though the inflation gas flows into the rear chamber, and thus the rear chamber greatly protrudes once to the rear, only the rear chamber can primarily protrude to the rear. That is, in the front passenger seat airbag apparatus according to the aspect of the present invention, the entire airbag does not protrude to the rear unlike the airbag of the related art, and thus the amount of protrusion to the rear is small. When the rear chamber retracts to the front as a reaction to the protrusion of the rear chamber to the rear, the supported portion supported by the instrument panel can prevent the rear chamber from moving a great distance to the front. For this reason, the rear chamber can be prevented from being inflated while oscillating considerably in the front and rear direction. As a result, in the front passenger seat airbag apparatus according to the aspect of the present invention, even though the opening area of the communication portion at the opening is large, and a great amount of the inflation gas flows into the rear chamber, the supported portion of the front chamber maintaining the inflated state can be accurately supported by the instrument panel. Furthermore, the protrusion of the airbag to the rear can be suppressed when the airbag is deployed and inflated, and the rear chamber can be prevented from being inflated while oscillating considerably in the front and rear direction. For this reason, in the front passenger seat airbag apparatus according to the aspect of the present invention, the entire airbag can be inflated in such a manner that the entire airbag is quickly and stably disposed between an occupant and the instrument panel.

Accordingly, in the front passenger seat airbag apparatus according to the aspect of the present invention, the inflation of the airbag can be quickly completed, and the occupant can be stably protected.

In the front passenger seat airbag apparatus according to the aspect of the present invention, the partition wall portion may be preferably made of a flexible base material in such a manner that the partition wall portion can be folded with the communication portion including the flow rate control mechanism. In the front passenger seat airbag apparatus with such a configuration, the partition wall portion can be smoothly and conveniently folded together with the airbag.

Furthermore, in the front passenger seat airbag apparatus according to the aspect of the present invention, when the airbag at the complete inflation is seen from the side, the substantially entire outer circumferential edge of the partition wall portion may be preferably disposed to separate from a surface of the instrument panel. In the front passenger seat airbag apparatus with such a configuration, the supported portion of the front chamber is supported by a wide region in every direction of the instrument panel, and even when the inflation gas flows into the rear chamber, the supported portion can be more stably supported by the instrument panel.

Furthermore, in the front passenger seat airbag apparatus according to the aspect of the present invention, when the airbag at the complete inflation is seen from the side, the partition wall portion may be preferably disposed to slope in a front and rear direction in such a manner that an upper-end side of the partition wall portion faces the front and a lower-end side thereof faces the rear. In the front passenger seat airbag apparatus with such a configuration, the front chamber, the internal pressure of which increases at the initial inflation of the airbag, can be prevented from greatly interfering with a windshield disposed above the instrument panel.

Furthermore, in the front passenger seat airbag apparatus according to the aspect of the present invention, the partition wall portion may preferably include two sheets of flexible base materials for a partition wall, and in a state where the base materials for a partition wall are placed in such a manner that corresponding edge portions of the base materials for a partition wall are aligned with each other, the edge portions may be preferably jointed with each other with a gap being partially provided. The communication portion may preferably be a substantially slit-shaped gap formed between the jointed portions in which the edge portions of the base materials for a partition wall are jointed with each other. The flow rate control mechanism may be preferably formed of circumferential edge portions of the communication portion in the base materials for a partition wall. The circumferential edge portions of the communication portion in the base materials for a partition wall may be preferably configured in such a manner that the communication portion is pulled in a closing direction by a tension exerted on a surface of the outer circumferential wall of the airbag when the airbag is deployed and inflated.

In the front passenger seat airbag apparatus with the aforementioned configuration, when the airbag is deployed and inflated, the inflation gas flows into the front chamber to increase the internal pressure thereof, and the front chamber is inflated while the support on the supported portion is ensured. Furthermore, when the internal pressure of the front chamber increases, and thus a pressure to push the partition wall portion outward exceeds a force which is caused to block the communication portion by the tension exerted on the surface of the partition wall portion, first, the respective circumferential edges of the communication portion in the base materials for a partition wall, which is constructed to the flow rate control mechanism, separate from each other, and the communication portion is opened. When the inflation gas flows into the rear chamber via the open communication portion, the internal pressure of the front chamber decreases, and thus the pressure to push the partition wall portion outward decreases, and the communication portion is pulled again in the closing direction by the tension exerted on the surfaces of the circumferential edge portions of the communication portion in the base materials for a partition wall. This state is repeated, and the inflation of the rear chamber is completed while the inflated state of the front chamber is maintained. For this reason, in the front passenger seat airbag apparatus with the aforementioned configuration, an open state of the communication portion can be adjusted by the internal pressure of the front chamber and the tension exerted on the surface of the partition wall portion. Even when the rear chamber is inflated, the inflated state of the front chamber can be maintained. As a result, in the front passenger seat airbag apparatus with the aforementioned, in simple configuration, the inflation of the rear chamber is not delayed (time to complete the inflation of the airbag is not delayed), and the inflated state of the front chamber can be accurately controlled.

DETAILED DESCRIPTION OF THE INVENTION

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
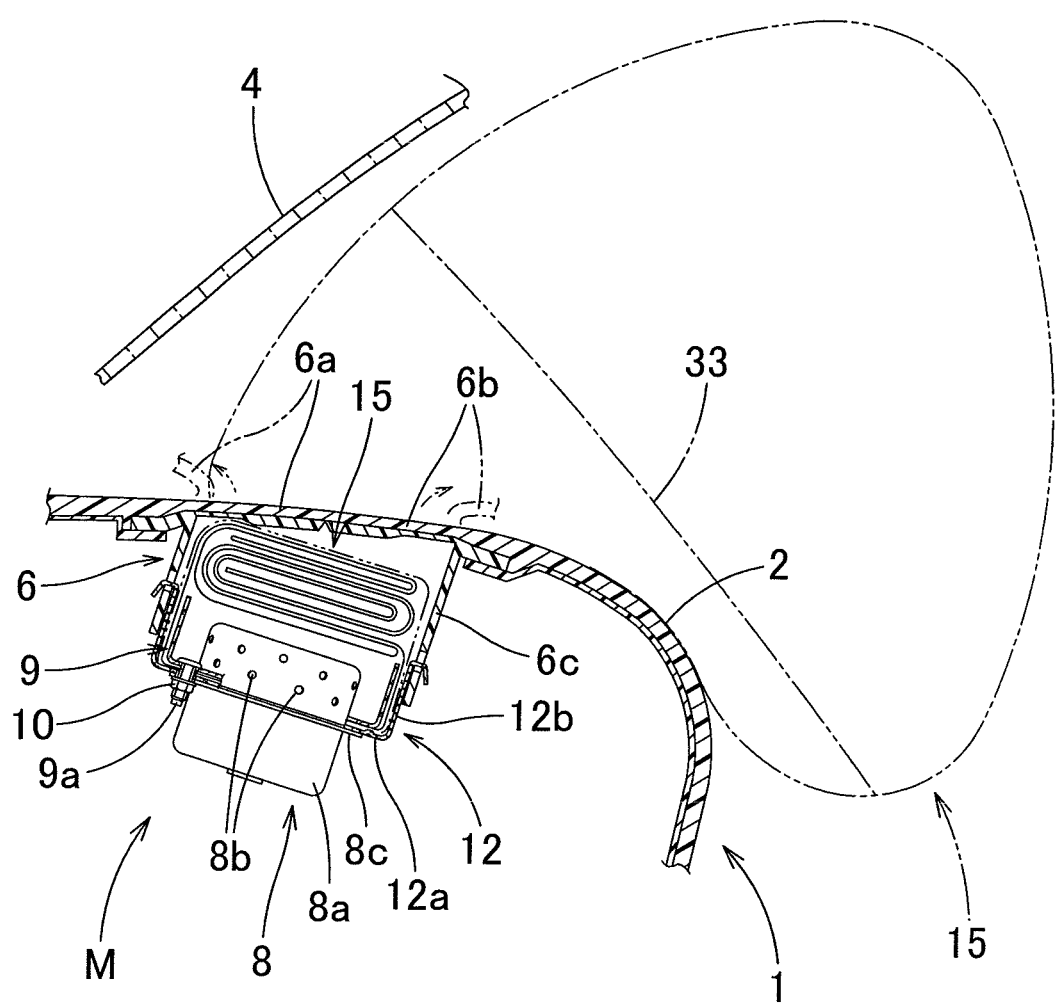
FIG. 1 is a vertical cross-sectional view illustrating a state where a front passenger seat airbag apparatus according to an embodiment of the present invention is mounted on a vehicle.

Hereinafter, an embodiment of the present invention will be described with reference to the accompanying drawings. As illustrated in FIG. 1, a front passenger seat airbag apparatus (hereinafter, referred to as an "airbag apparatus") M of the embodiment is a top mount type in which the airbag apparatus is disposed inside an upper surface 2 of an instrument panel 1. As illustrated in FIG. 1, the airbag apparatus M includes a folded airbag 15; an inflator 8; a case 12; a retainer 9; and an airbag cover 6 that covers the folded airbag 15. The inflator 8 supplies inflation gas to the airbag 15. The case 12 is an accommodating member that accommodates and retains the airbag 15 and the inflator 8. The retainer 9 is a member that attaches the airbag 15 and the inflator 8 to the case 12.

The airbag cover 6 is formed integrally with the instrument panel 1 made of a synthetic resin. The airbag cover 6 has two front and rear door portions 6a and 6b which are pushed and opened by the airbag 15 when the airbag 15 is deployed and inflated. A connecting wall portion 6c is formed around the door portions 6a and 6b of the airbag cover 6 to connect to the case 12.

The inflator 8 includes a substantially columnar main body portion 8a that has a plurality of gas discharge ports 8b, and a flange portion 8c that attaches the inflator 8 to the case 12.

The case 12 is made of a metal plate to form a substantially rectangular parallelepiped shape and to have a substantially rectangular opening on an upper-end side thereof. The case 12 includes a substantially rectangular plate-shaped bottom wall portion 12a to which the inflator 8 is inserted from a bottom to be attached, and a circumferential wall portion 12b that extends upward from an outer circumferential edge of the bottom wall portion 12a. The connecting wall portion 6c of the airbag cover 6 is locked into the circumferential wall portion 12b. In the bottom wall portion 12a, an insertion hole (a reference sign is omitted) into which the inflator 8 is inserted is formed, and an insertion hole (a reference sign is omitted) into which each bolt 9a of the retainer 9 is inserted is formed. In the embodiment, each bolt 9a of the retainer 9 disposed in the airbag 15 passes through a circumferential edge of a gas inlet port 22 of the airbag 15, the bottom wall portion 12a of the case 12 and the flange portion 8c of the inflator 8, and each bolt 9a is stopped by a nut 10. Accordingly, the airbag 15 and the inflator 8 are attached to the case 12. The bottom wall portion 12a of the case 12 is provided with brackets which connect to a body of a vehicle and are not illustrated in the drawing.

Figure 14:
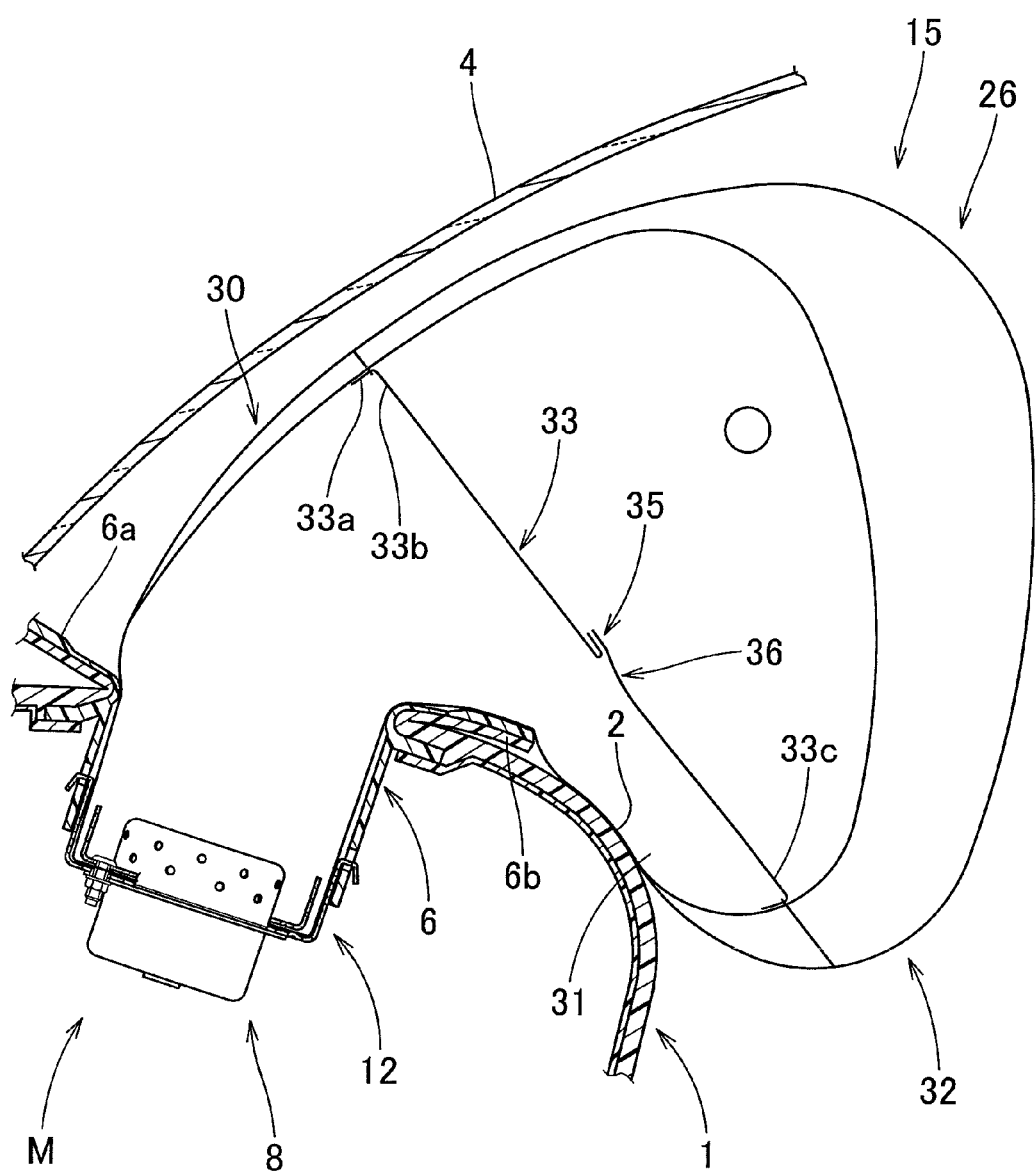
FIG. 14 is a schematic cross-sectional view taken along the front and rear direction illustrating a state where inflation of the airbag is completed in the front passenger seat airbag apparatus of the embodiment.

In the embodiment, as illustrated by a two-dot chain line in FIG. 1 and as illustrated in FIG. 14, the airbag 15 has a substantially bag shape so that the airbag 15 can fill up a space between the upper surface 2 of the instrument panel 1 and a windshield 4 above the instrument panel 1 at the complete inflation, and so that the inflated airbag 15 can be disposed on the upper surface 2 of the instrument panel 1 having a slight gap between the windshield 4. Specifically, as illustrated in FIGS. 2 to 5, the airbag 15 at the complete inflation has a substantially pyramidal shape in which an apex portion of the airbag is disposed on a front-end side. The airbag 15 includes an occupant-side wall portion 26 which becomes an occupant side at the complete inflation, and a circumferential wall portion 16. The circumferential wall portion 16 has a tapered shape in which the circumferential wall portion 16 extends to the front from a circumferential edge of the occupant-side wall portion 26, and converges toward the front-end side.

Figure 2:
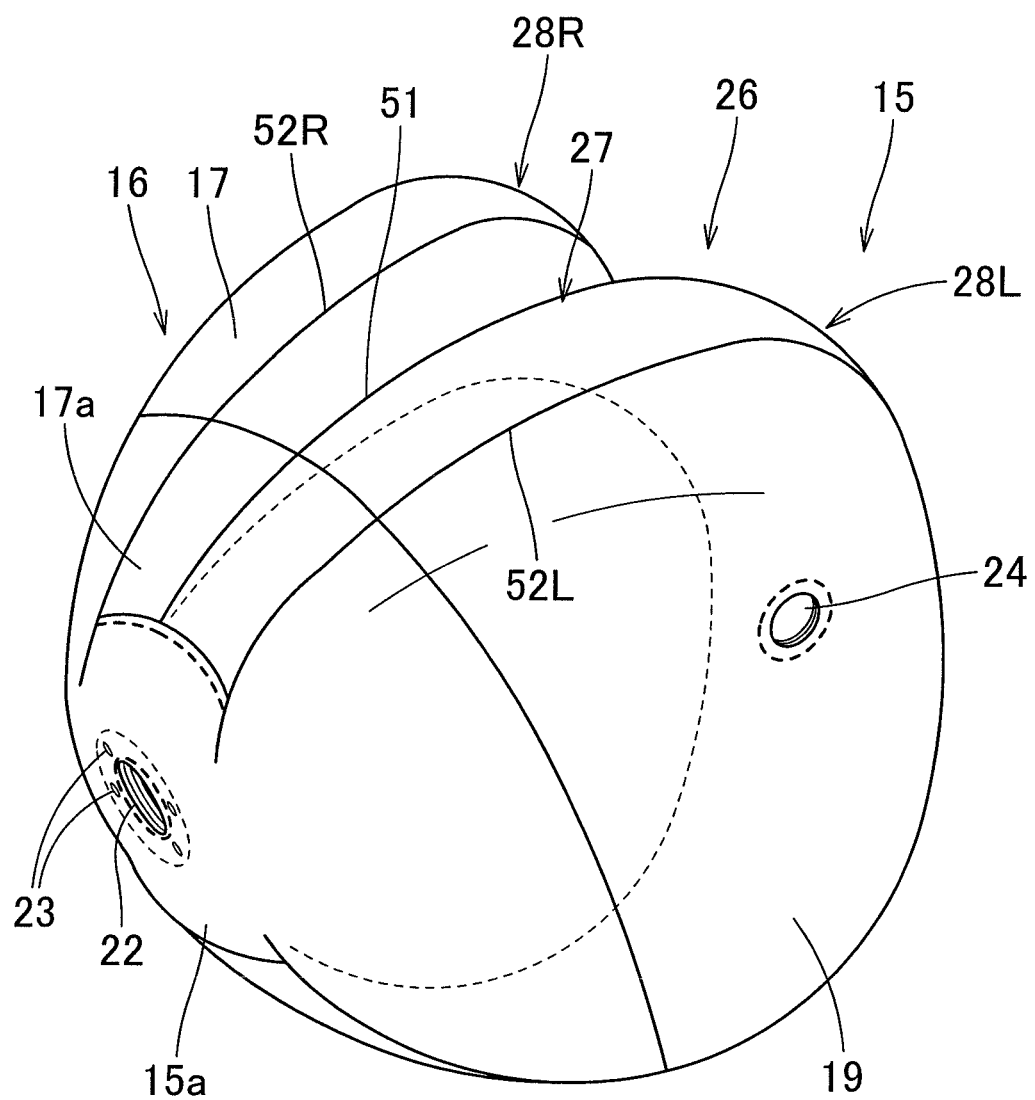
FIG. 2 is a perspective view of an airbag inflated as a single body, which is used in the airbag apparatus of the embodiment.
Figure 3:
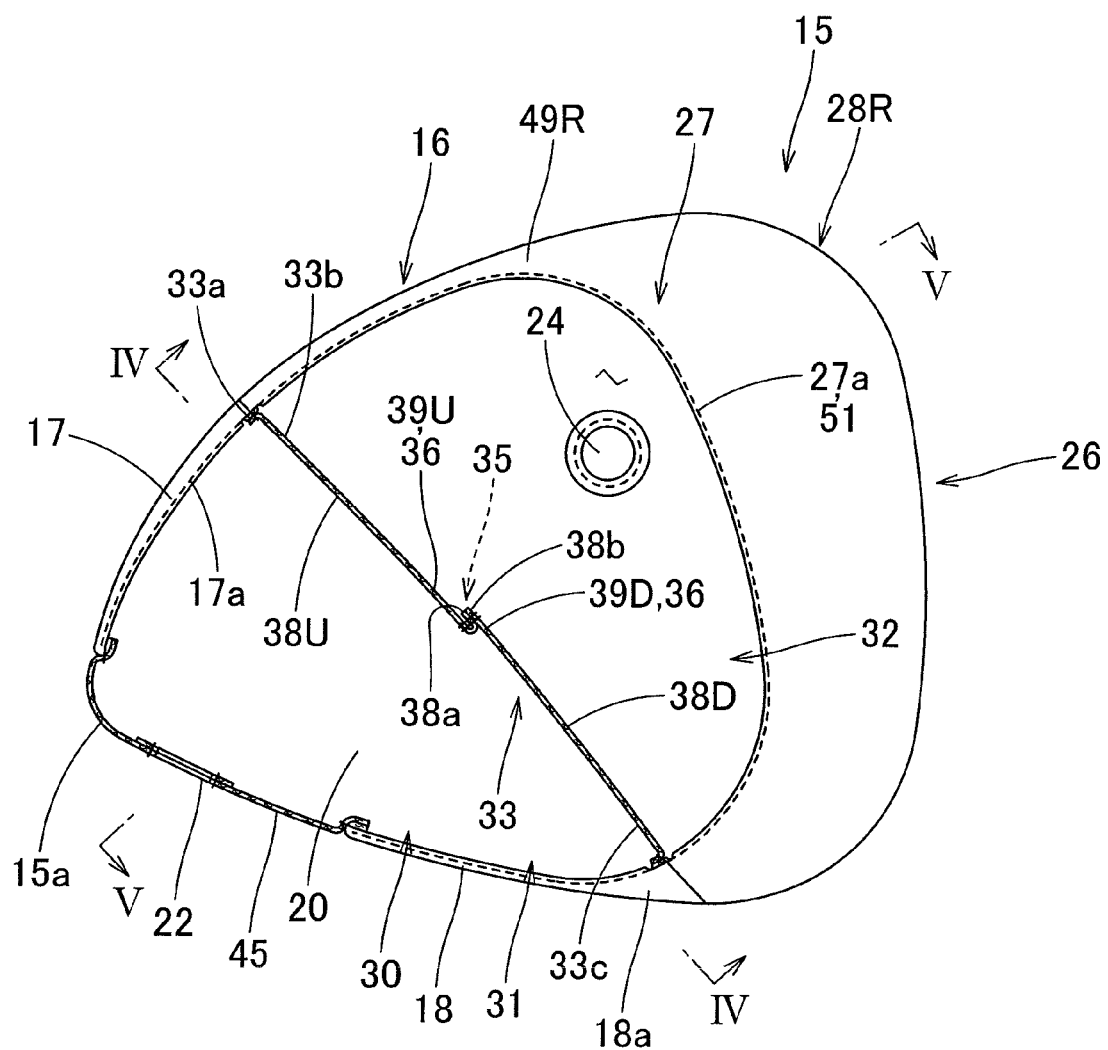
FIG. 3 is a schematic cross-sectional view of the airbag in FIG. 2 taken along a front and rear direction of the vehicle.

The circumferential wall portion 16 is a portion that is primarily disposed above the upper surface 2 of the instrument panel 1 at the complete inflation of the airbag 15. The circumferential wall portion 16 includes an upper wall portion 17 and a lower wall portion 18 which are respectively disposed on upper and lower sides along a substantially right and left direction, and a left wall portion 19 and a right wall portion 20 which are respectively disposed on left and right sides along a substantially front and rear direction. The gas inlet port 22 is formed in the vicinity of a front end 15a of the airbag 15, and inflation gas 3 can flow into the airbag 15 via the gas inlet port 22 at the complete inflation of the airbag 15. The gas inlet port 22 is formed at a center position in the right and left direction in the vicinity of a front end of the lower wall portion 18 of the circumferential wall portion 16. The gas inlet port 22 is open in a substantially circular shape. A plurality of (four in the embodiment) attachment holes 23 are formed in the circumferential edge of the gas inlet port 22. The attachment holes 23 are formed to allow the bolt 9a of the retainer 9 to be inserted thereinto, and to attach the circumferential edge of the gas inlet port 22 to the bottom wall portion 12a of the case 12. The gas inlet port 22 and the attachment hole 23 are formed in a region of a front chamber 30 to be described in the airbag 15 (refer to FIG. 3). A vent hole 24 is formed to have a substantially circular-shaped opening in each of the left wall portion 19 and the right wall portion 20 of the circumferential wall portion 16. These vent holes 24 are to exhaust surplus of the inflation gas that flows into the airbag 15. In the embodiment, as illustrated in FIGS. 2 and 3, each vent hole 24 is formed in a portion (a portion in the rear of a partition wall portion 33) of each of the left wall portion 19 and the right wall portion 20, which forms a region of a rear chamber 32 to be described.

The occupant-side wall portion 26 is disposed to face an occupant sitting in a front passenger seat at the complete inflation of the airbag 15. The occupant-side wall portion 26 is provided along a substantially vertical direction in a rear-end side of the airbag 15. In the airbag 15 of the embodiment, the entire occupant-side wall portion 26 forms the region of the rear chamber 32. In the embodiment, the occupant-side wall portion 26 is provided with a recessed area 27 that is recessed toward the front along the substantially vertical direction at the substantially center position in the right and left direction at the complete inflation of the airbag 15 (refer to FIGS. 2, 3, and 5). In the embodiment, the recessed area 27 is provided in the substantially entire vertical region of the occupant-side wall portion 26. Protruding portions 28L and 28R, which protrude relatively to the rear, are respectively provided on left and right sides of the recessed area 27 of the occupant-side wall portion 26. That is, the following are continuously provided in the vertical direction in the occupant-side wall portion 26 of the airbag 15 of the embodiment at the complete inflation of the airbag 15: the recessed area 27 that is recessed at the center in the right and left direction, and the protruding portions 28L and 28R which are respectively disposed on the left and the right sides of the recessed area 27 (refer to FIGS. 3 and 5). Specifically, in the embodiment, a state where the left protruding portion 28L and the right protruding portion 28R are uplifted in the substantially entire vertical region of the occupant-side wall portion 26 is the substantially same as a state where the recessed area 27 is recessed in the substantially entire vertical region of the occupant-side wall portion 26. In regions of the upper wall portion 17 and the lower wall portion 18 of the circumferential wall portion 16, the left protruding portion 28L and the right protruding portion 28R are uplifted and the recessed area 27 is recessed in such a manner that the recessed and the convex shapes converge toward the front. In the airbag 15 of the embodiment, a recessed bottom portion (a front end 27a) of the recessed area 27 is formed of an inner stitched portion 51. The inner stitched portion 51 is formed by stitching inner circumferential edges 49b of inner panel fabrics 49L and 49R to be described of the occupant-side wall portion 26. A protruding apex portion 28a of each of the protruding portions 28L and 28R is respectively formed of outer stitched portions 52L and 52R (refer to FIGS. 3, 5, and 6). The outer stitched portions 52L and 52R are formed by stitching respective circumferential edge portions 46a and 47a of a left portion 46 and a right portion 47 of an outer panel fabric 44 to be described together with respective outer circumferential edges 49a of the inner panel fabrics 49L and 49R.

Figure 5:
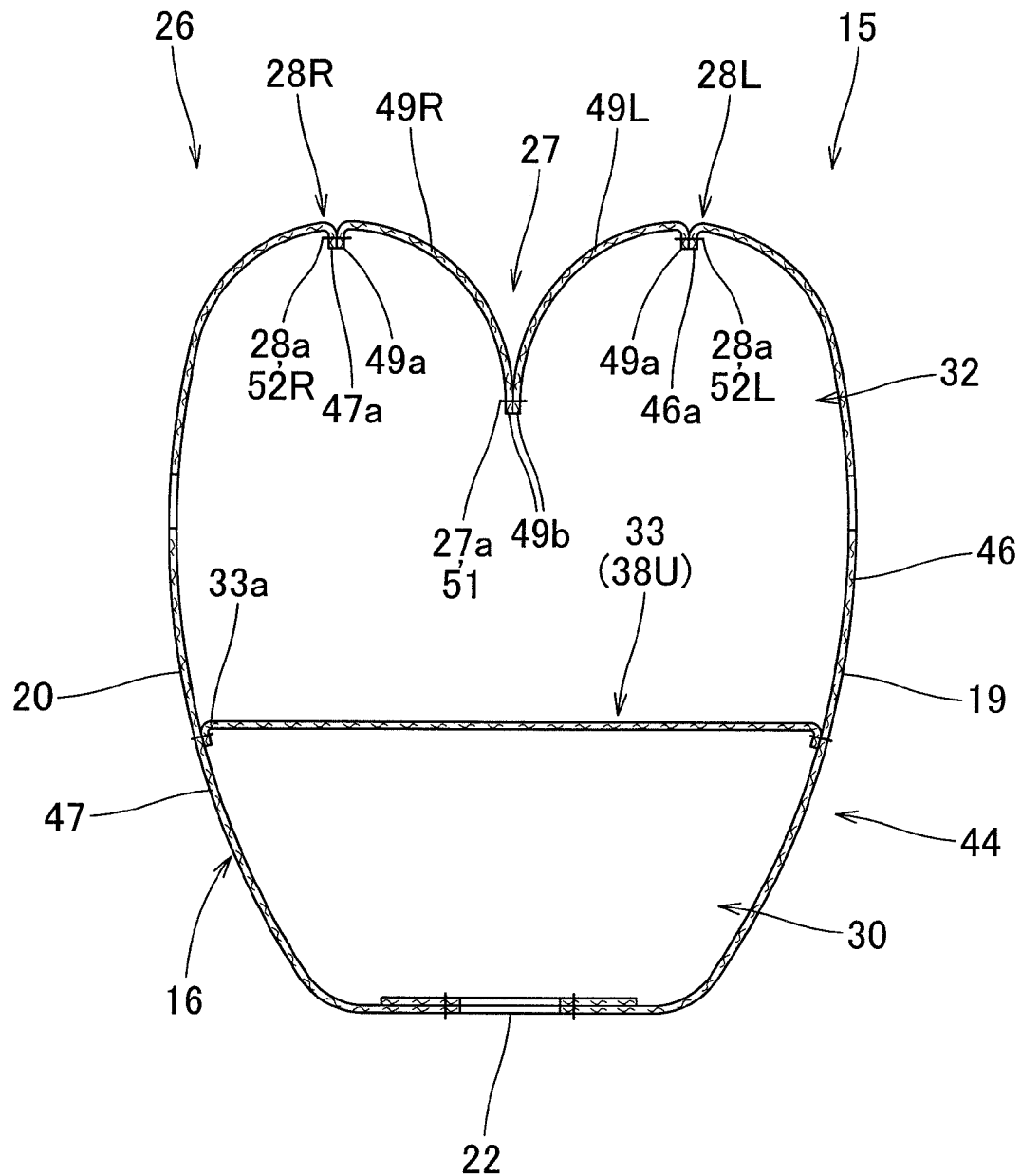
FIG. 5 is a schematic cross-sectional view of the airbag taken along line V-V in FIG. 3.

In the airbag apparatus M of the embodiment, the partition wall portion 33 is disposed in the airbag 15 to partition an inner region of the airbag 15 into the front chamber 30 and the rear chamber 32 at the complete inflation. In the embodiment, as illustrated in FIGS. 3 and 5, when the airbag 15 at the complete inflation is seen from the side, the partition wall portion 33 is disposed in a region of the circumferential wall portion 16. The entire outer circumferential edge 33a of the partition wall portion 33 is stitched to the upper wall portion 17, the lower wall portion 18, the left wall portion 19 and the right wall portion 20 of the circumferential wall portion 16 using a suture. The partition wall portion 33 partitions the inner region of the airbag 15 in the front and rear direction. In detail, in the embodiment, when the airbag 15 at the complete inflation is seen from the side, the entire outer circumferential edge 33a of the partition wall portion 33 is disposed to separate upward or rearward from the upper surface 2 (the surface) of the instrument panel 1. The partition wall portion 33 is disposed to slope in the front and rear direction in such a manner that an upper end 33b of the partition wall portion 33 faces the front and a lower end 33c thereof faces the rear (refer to FIG. 14). In more detail, in the embodiment, the partition wall portion 33 is disposed in a substantially flat plate shape at the complete inflation of the airbag 15. The upper end 33b of the partition wall portion 33 is disposed at a position which is located in a front end 17a of the upper wall portion 17, and is located substantially right above the case 12. The lower end 33c of the partition wall portion 33 is disposed in the vicinity of a rear end 18a of the lower wall portion 18. A slope angle of the partition wall portion 33 is set to be small in a horizontal direction (in the front and rear direction), and the partition wall portion 33 is disposed to slope in the front and rear direction.

In the airbag 15 of the embodiment, the front chamber 30 is defined as a region that is surrounded by a portion in front of the partition wall portion 33 of the circumferential wall portion 16 and by the partition wall portion 33. The rear chamber 32 is defined as a region that is surrounded by a portion in the rear of the partition wall portion 33 of the circumferential wall portion 16, the occupant-side wall portion 26 and the partition wall portion 33. The front chamber 30 includes a supported portion 31 supported by a portion of the upper surface 2 of the instrument panel 1, which becomes the circumferential edge of the case 12 at the complete inflation of the airbag 15. In the embodiment, the entire outer circumferential edge 33a of the partition wall portion 33 is disposed to separate from the upper surface 2 of the instrument panel 1. The front chamber 30 is flat and is configured to widely cover the upper surface 2 of the instrument panel 1. As a result, the supported portion 31 can be in contact with wide regions of the upper surface 2 of the instrument panel 1 at the complete inflation of the airbag 15, and the regions are present across the left, the right and the rear of the case 12. Accordingly, the supported portion 31 is supported by the wide regions of the instrument panel 1, which are located on the left, the right and the rear of the case 12.

Figure 4:
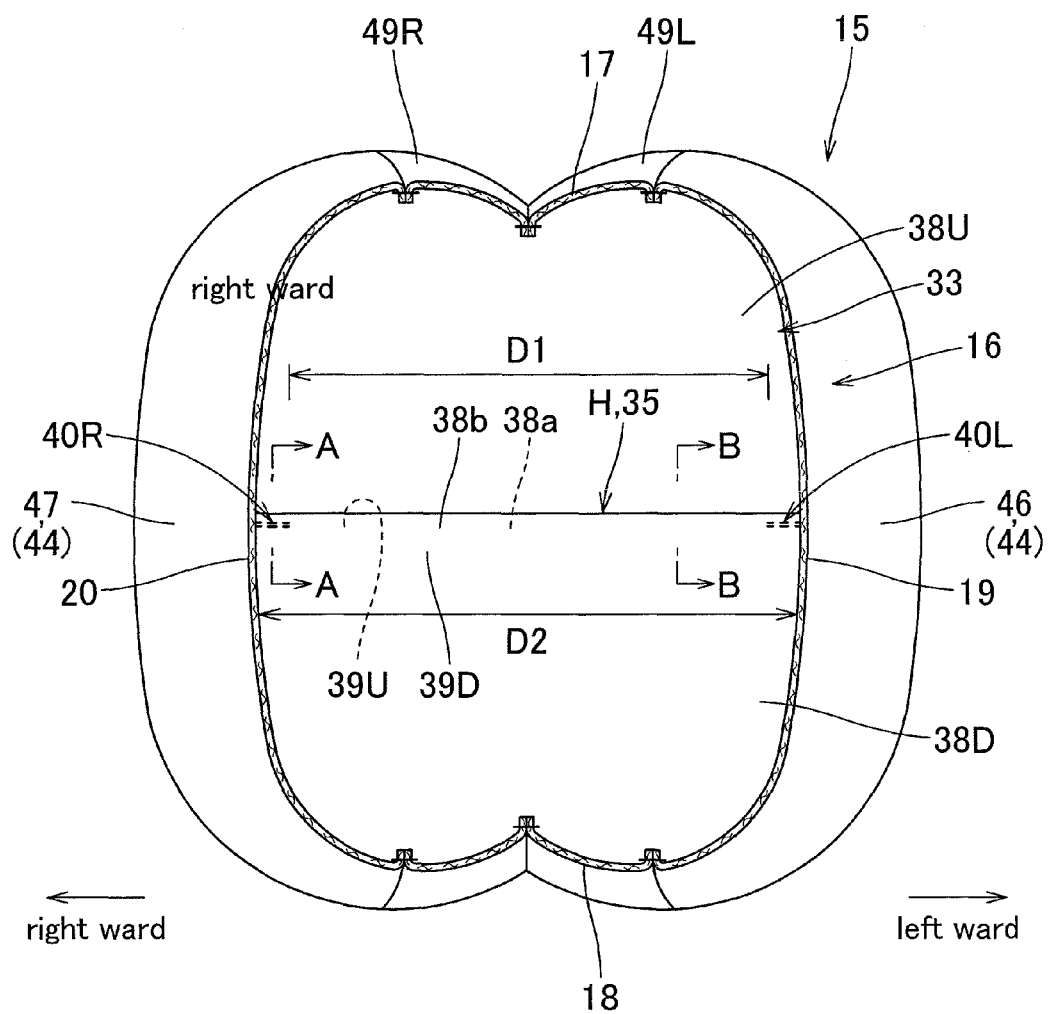
FIG. 4 is a schematic cross-sectional view of the airbag taken along line IV-IV in FIG. 3.
Figure 4:
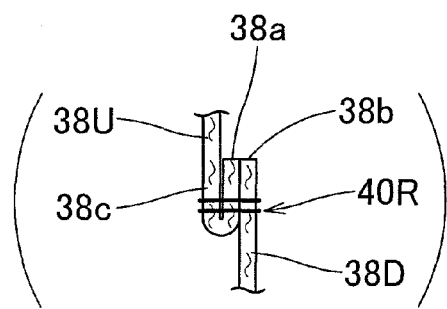
Figure 4:
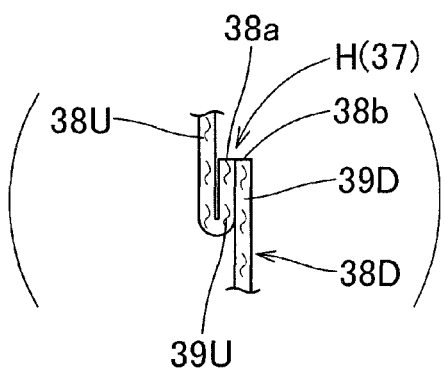

A communication portion 35 is formed in the partition wall portion 33 for communication between the front chamber 30 and the rear chamber 32. The communication portion 35 includes a flow rate control mechanism 36 that controls a flow rate of the inflation gas G flowing from the front chamber 30 into the rear chamber 32 by increasing or decreasing an opening area thereof. Specifically, as illustrated in FIGS. 3 and 4, the partition wall portion 33 is formed of two sheets of flexible base materials (in the embodiment, woven fabrics) 38U and 38D for a partition wall. In a state where the base materials 38U and 38D for a partition wall are placed in such a manner that adjacent edge portions (a lower edge 38a and an upper edge 38b) thereof are aligned with each other, the edge portions (the lower edge 38a and the upper edge 38b) are jointed with each other with a gap being partially provided. The communication portion 35 is a substantially slit-shaped gap H formed between stitched portions 40L and 40R as the jointed portions in which the edge portions (the lower edge 38a and the upper edge 38b) of the base materials 38U and 38D for a partition wall are jointed with each other. In the embodiment, circumferential edge portions 39U and 39D which are respective circumferential edges of the communication portion 35 in the base materials 38U and 38D for a partition wall configures the flow rate control mechanism 36. That is, in the airbag 15 of the embodiment, the partition wall portion 33 is formed of flexible base materials (the base materials 38U and 38D for a partition wall) in such a manner that the partition wall portion 33 and the communication portion 35 including the flow rate control mechanism 36 can be folded integrally with the outer circumferential wall (the circumferential wall portion 16 and the occupant-side wall portion 26) of the airbag 15. In a detailed description, in the embodiment, the partition wall portion 33 is formed by arranging in a line two upper and lower base materials 38U and 38D for a partition wall. The partition wall portion 33 is configured as follows (refer to FIG. 4): In a state where the lower edge 38a extending linearly in the right and left direction of the upper base material 38U for a partition wall is aligned to overlap with the upper edge 38b extending linearly in the right and left direction of the lower base material 38D for a partition wall, and two end edges of the lower edge 38a and the upper edge 38b are tipped toward an occupant side (a rear-surface side) and toward the upper base material 38U for a partition wall, then left and right ends of the lower edge 38a and the upper edge 38b are stitched using a suture so as to form the stitched portions (the jointed portions) 40L and 40R together with upper base material 38U for a partition wall. In the embodiment, the base materials 38U and 38D for a partition wall are configured in such a manner that the communication portion 35 is disposed at a substantially center position in a vertical direction and in the right and left direction of the partition wall portion 33 at the complete inflation of the airbag 15.

In the embodiment, the circumferential edge portions 39U and 39D of the communication portion 35 in the base materials 38U and 38D for a partition wall, which configures the flow rate control mechanism 36, are configured in such a manner that the communication portion 35 is pulled in a closing direction by a tension T exerted on a surface of the outer circumferential wall (the circumferential wall portion 16 and the occupant-side wall portion 26) of the airbag 15 when the airbag 15 is deployed and inflated. Specifically, the tension T exerted on the surface of the outer circumferential wall of the airbag 15 is also exerted on a surface of the partition wall portion 33 so as to bring the circumferential edge portions 39U and 39D of the partition wall portion 33 close to each other, and thus the communication portion 35 is blocked (refer to FIG. 13A). When the front chamber 30 inflates to form an inflated shape substantially equivalent to a completely inflated shape of the airbag 15, and an internal pressure of the front chamber 30 starts increasing, a pressure F (refer to FIGS. 12A and 12B) is exerted to push the part of the circumferential wall portion 16 and the partition wall portion 33 of the front chamber 30 outward. When the internal pressure of the front chamber 30 increases, and the pressure F exceeds a force which is caused to block the communication portion 35 by the tension T, the gap H is opened so as to separate the circumferential edge portions 39U and 39D of the communication portion 35 from each other and to open the circumferential edge portions 39U and 39D. Accordingly, an opening portion 37 is formed and the communication portion 35 becomes open (refer to FIGS. 12B and 13B). As illustrated in FIGS. 12B and 13A to 13C, when the communication portion 35 is open, the inflation gas G flowing into the front chamber 30 flows into the rear chamber 32 via the communication portion 35. However, when the inflation gas flows into the rear chamber 32, the internal pressure of the front chamber 30 decreases, the pressure F is less than the tension T, and the circumferential edge portions 39U and 39D of the flow rate control mechanism 36, which are the respective circumferential edge portions of the communication portion 35 in the base materials 38U and 38D for a partition wall, are pulled again to be close to each other by the tension T. The communication portion 35 is not completely closed by the tension T, and the communication portion 35 maintains a reduced opening area to suppress a flow rate of the inflation gas G flowing into the rear chamber 32 (refer to FIG. 13C). For this reason, the front chamber 30 maintains a substantially constant internal pressure and an inflated state until the complete inflation of the airbag 15 (until complete inflation of the rear chamber 32).

In the embodiment, the slit-shaped gap H of the communication portion 35 is set to have a width dimension D1 (refer to FIG. 4) in which the inflation gas can quickly flow into the rear chamber 32 to quickly inflate the rear chamber 32 when the communication portion 35 is open. Specifically, in the embodiment, the partition wall portion 33 is set to have a width dimension D2 (refer to FIG. 4) in a range of 400 mm to 500 mm, which is a dimension in the right and left direction. The width dimension D1 of the communication portion 35 is set to be large, which is approximately 300 mm. For this reason, the communication portion 35 becomes a large opening area when the communication portion 35 is open, and a great amount of the inflation gas G can flow into the rear chamber 32. Even though the opening area of the communication portion 35 decreases, the communication portion 35 allows a certain amount of the inflation gas G to flow into the rear chamber 32.

Figure 6:
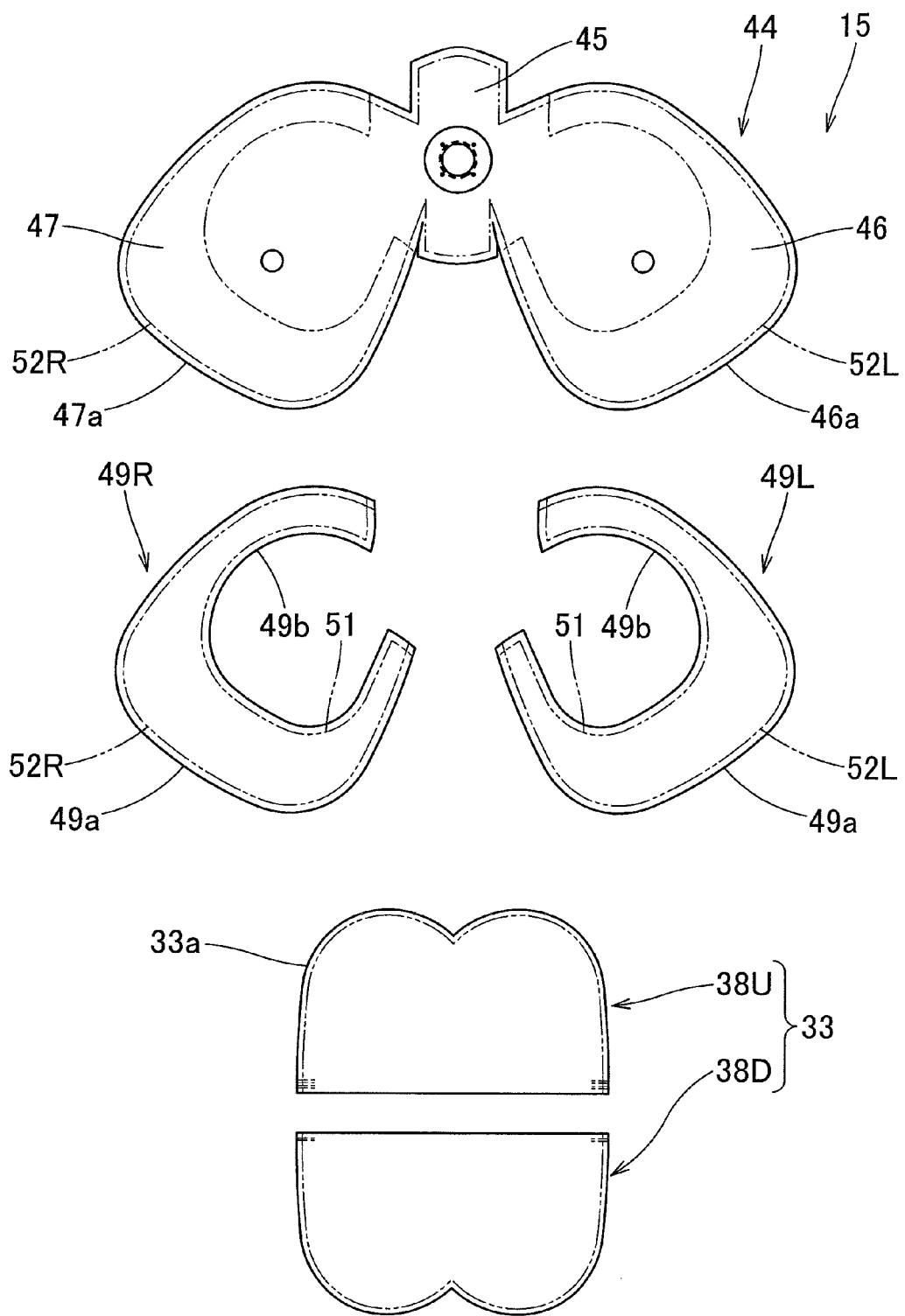
FIG. 6 is a plane view of a base fabric of the airbag of the embodiment.

The airbag 15 of the embodiment is formed by joining the circumferential edges of basic fabrics with a predetermined shape to each other. As illustrated in FIG. 6, the airbag 15 includes the outer panel fabric 44 and a pair of the inner panel fabrics 49L and 49R. The outer panel fabric 44 forms the left wall portion 19 and the right wall portion 20 and a front region of the lower wall portion 18 of the circumferential wall portion 16. The inner panel fabrics 49L and 49R form the upper wall portion 17 and a rear region of the lower wall portion 18 of the circumferential wall portion 16, and the occupant-side wall portion 26.

The outer panel fabric 44 has a bilateral symmetrical shape that is similar to a shape of a butterfly with spread wide wings. The outer panel fabric 44 includes a lower portion 45, the left portion 46 and the right portion 47. The lower portion 45 has a substantially rectangular shape and forms the circumferential edge portion of the gas inlet port 22. The lower portion 45 forms the front region of the lower wall portion 18 of the airbag 15 at the complete inflation. The left portion 46 and the right portion 47 are provided to extend respectively toward the left and right sides from the lower portion 45, and have a substantially triangular plate shape. The left portion 46 and the right portion 47 primarily form the left wall portion 19 and the right wall portion 20, respectively, of the airbag 15 at the complete inflation.

The inner panel fabrics 49L and 49R are formed of the pair of left and right belt-like portions which are bent in a substantially C shape. The inner panel fabrics 49L and 49R are configured to bisect in the right and left direction a region across from the upper wall portion 17 via the occupant-side wall portion 26 to the rear portion of the lower wall portion 18 at the complete inflation. In the embodiment, the inner panel fabrics 49L and 49R are formed in such a manner that shapes of the outer circumferential edges 49a are substantially aligned to shapes of the respective circumferential edge portions 46a and 47a of the left portion 46 and the right portion 47 of the outer panel fabric 44.

In the embodiment, the outer panel fabric 44, the inner panel fabrics 49L and 49R of the airbag 15, and the base materials 38U and 38D for a partition wall are made of a flexible fabric woven with a polyester yarn, a polyamide yarn, or the like. In detail, the woven fabric is made of a non-coated fabric that is not coated with a coating agent such as silicon. In the airbag 15 of the embodiment, a substantially circular reinforcement fabric (a reference sign is omitted) is disposed in the circumferential edge of the gas inlet port 22.

The mounting of the airbag 15 of the embodiment on the vehicle will be described. First, a preliminary folded airbag 55 is formed in such a manner that each bolt 9a protrudes from each attachment hole 23, and the retainer 9 is provided therein. Thereafter, the preliminary folded airbag 55 is folded by the following folding so as to obtain the folded airbag 15: front to rear size reduction folding in which the preliminary folded airbag 55 is folded along a folding mark which is present along the right and left direction, and right to left size reduction folding in which the preliminary folded airbag 55 is folded along a folding mark which is present along the front and rear direction.

Figure 7:
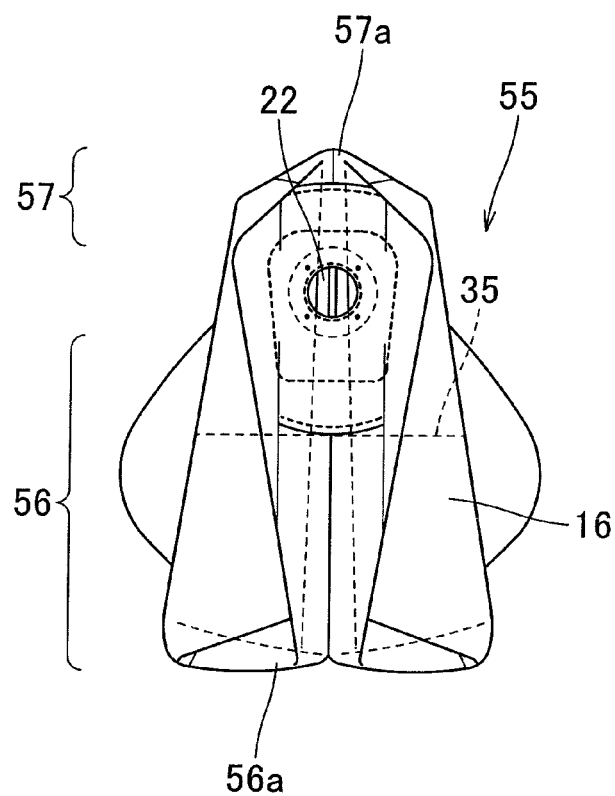
FIG. 7 is a plan view of a preliminary folded airbag into which the airbag of the embodiment is preliminarily folded.
Figure 8:
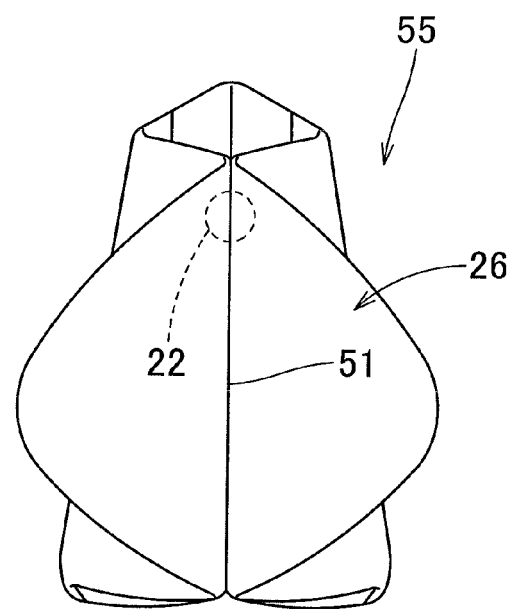
FIG. 8 is a bottom view of the preliminary folded airbag in FIG. 7.

As illustrated in FIGS. 7 and 8, the preliminary folded airbag 55 has a substantially bilateral symmetrical shape and a substantially flat shape. The preliminary folded airbag 55 is folded along a folding mark which is present at a predetermined place of the circumferential wall portion 16 along the front and rear direction in such a manner that an upper region of the occupant-side wall portion 26 is deployed to be flat. The communication portion 35 formed in the partition wall portion 33 is disposed in the preliminary folded airbag 55 so as not to be opened (so as not to widen the gap H). In detail, the respective lower edge 38a and upper edge 38b of the base materials 38U and 38D for a partition wall overlap so as to be in contact with each other, and the communication portion 35 is disposed in a substantially linear line which is present along the substantially right and left direction. Specifically, the communication portion 35 is disposed along the substantially right and left direction in a rear region of the gas inlet port 22 (refer to FIG. 7).

Figure 9A:
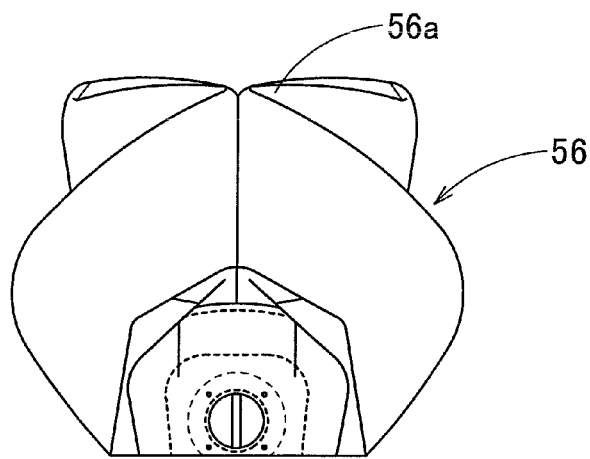
FIGS. 9A to 9C illustrate schematic views showing a process of folding the airbag of the embodiment.
Figure 9B:
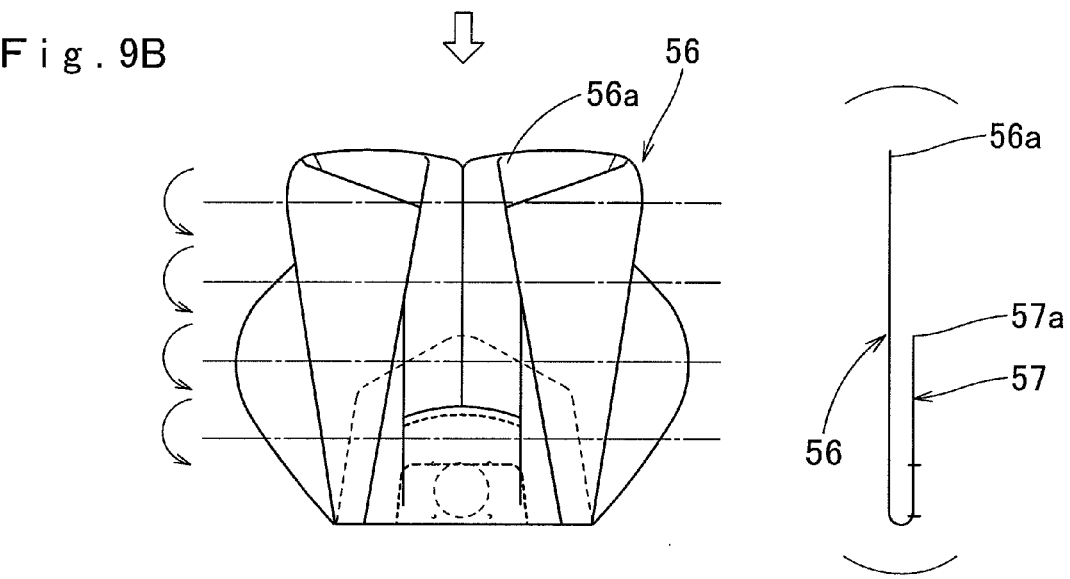
Figure 9C:
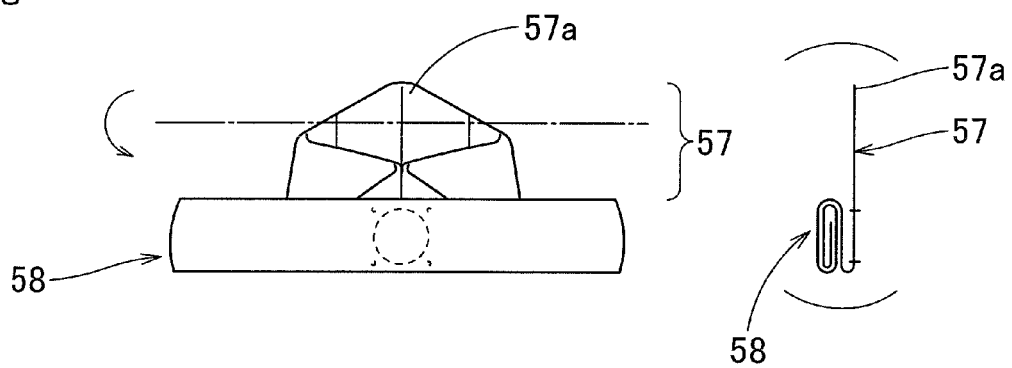
Figure 10A:
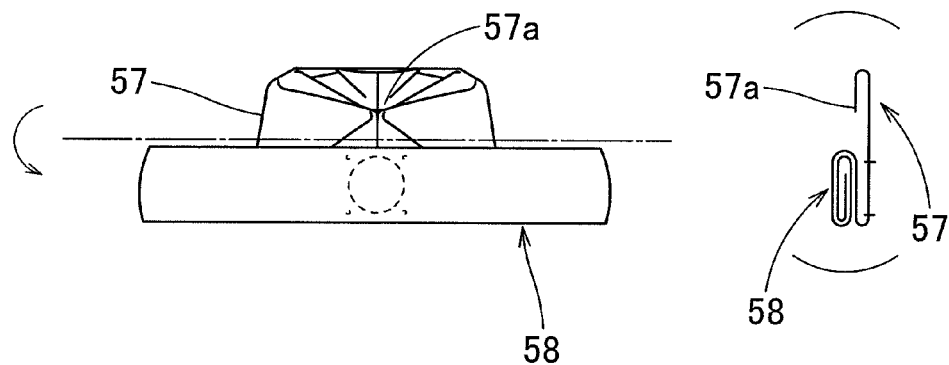
FIGS. 10A to 10C illustrate schematic views showing a process of folding the airbag of the embodiment, and illustrate a process after the process shown in FIGS. 9A to 9C.
Figure 10B:
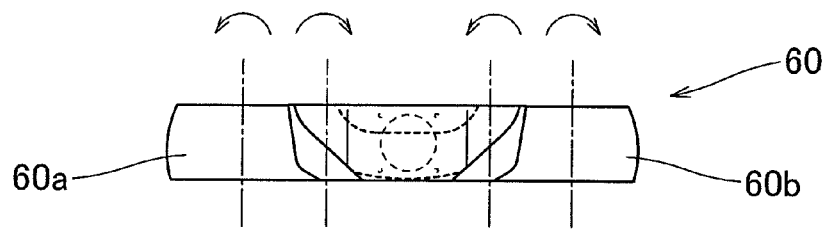

When the front to rear size reduction folding is performed, as illustrated in FIGS. 8, 9A, and 9B, first, a rear portion 56 is roll-folded in such a manner that an end portion 56a approaches the gas inlet port 22. Here, the rear portion 56 is disposed in the rear of the gas inlet port 22 in the preliminary folded airbag 55. A roll-folded portion 58 is mounted above the gas inlet port 22 (refer to FIG. 9C). Subsequently, as illustrated in FIGS. 10A and 10B, a front portion 57 is also roll-folded in such a manner that an end portion 57a approaches the gas inlet port 22. Here, the front portion 57 is disposed in front of the gas inlet port 22 in the preliminary folded airbag 55. Thereafter, the roll-folded portion is folded to be mounted above the roll-folded portion 58. In this way, a front to rear size reduction folded airbag 60 is formed (refer to FIG. 10B).

Figure 10C:
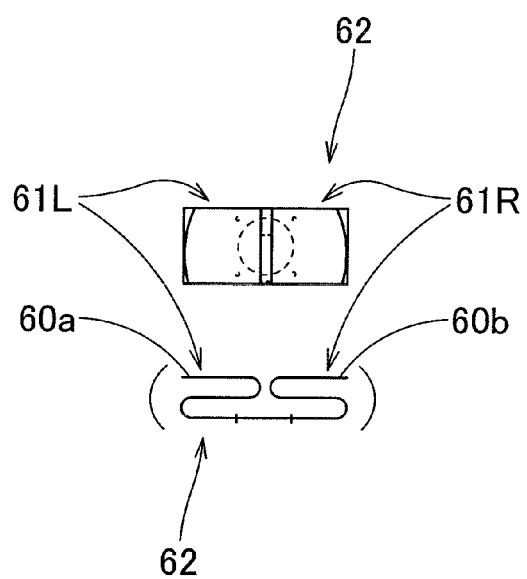

Thereafter, left and right portions are bellows-folded along a folding mark present along the front and rear direction in such a manner that the end portions 60a and 60b approach the gas inlet port 22. Herein, the left and right portions are respective disposed in left and right of the gas inlet port 22 in the front to rear size reduction folded airbag 60. The right to left size reduction folding is performed in such a manner that bellows-folded portions 61L and 61R formed in this way are placed above the gas inlet port 22. Accordingly, as illustrated in FIG. 10C, a completely folded body 62 is formed, and the folding of the airbag 15 is completed.

Subsequently, a breakable wrapping which is not illustrated wraps the completely folded body 62 in such a manner that a folded state of the completely folded body 62 is retained. Each bolt 9a is inserted through the bottom wall portion 12a of the case 12, and the folded airbag 15 (the completely folded body 62) is mounted on the bottom wall portion 12a of the case 12. Subsequently, the main body portion 8a of the inflator 8 is inserted into the case 12 from the bottom of the bottom wall portion 12a. At this time, each bolt 9a protruding downward from the bottom wall portion 12a is inserted through the flange portion 8c of the inflator 8. Thereafter, each bolt 9a protruding from the flange portion 8c of the inflator 8 is tightened by the nut 10. In this way, the folded airbag 15 and the inflator 8 can be attached to the bottom wall portion 12a of the case 12.

The circumferential wall portion 12b of the case 12 is locked into the connecting wall portion 6c of the airbag cover 6 of the instrument panel 1 mounted on the vehicle. Subsequently, when the predetermined bracket of the case 12, which is not illustrated, is fixed to the body of the vehicle, the airbag apparatus M can be mounted on the vehicle.

When the airbag apparatus M is mounted on the vehicle, and then the inflation gas G is discharged via each gas discharge port 8b of the inflator 8 during a front impact collision of the vehicle, the inflation gas G flows into and inflates the airbag 15. The inflating airbag 15 pushes and opens the door portions 6a and 6b of the airbag cover 6. Thereafter, the airbag 15 protrudes upward via an opening formed in the case 12 by opening the door portions 6a and 6b of the airbag cover 6, and the airbag 15 is deployed and inflated toward the rear side of the vehicle. As illustrated by a two-dot chain line in FIG. 1 and illustrated by FIG. 14, the inflation of the airbag 15 is completed.

Figure 11A:
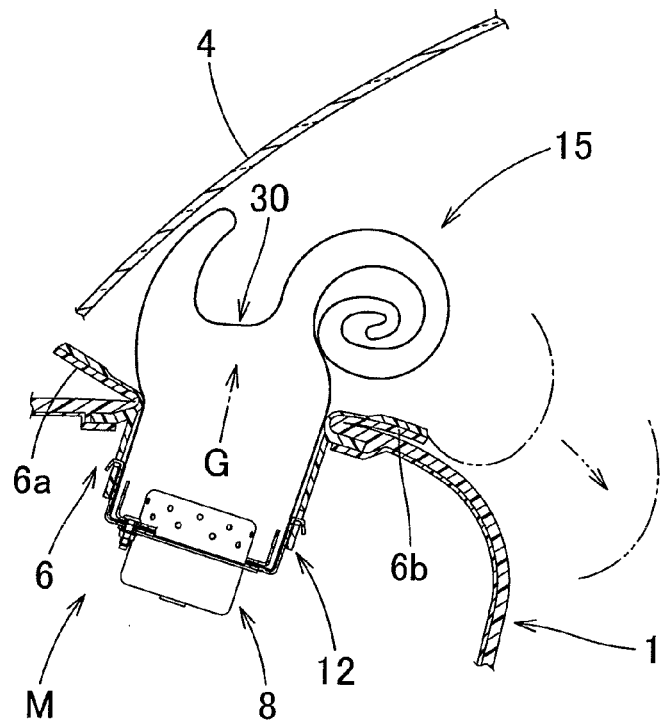
FIGS. 11A and 11B illustrate schematic views showing stages at which the airbag is inflated in the front passenger seat airbag apparatus of the embodiment.
Figure 11B:
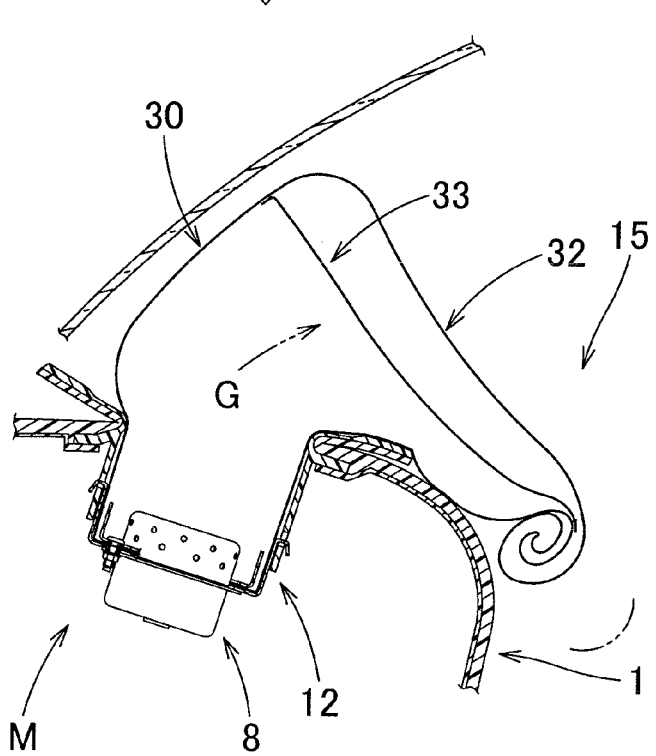
Figure 12A:
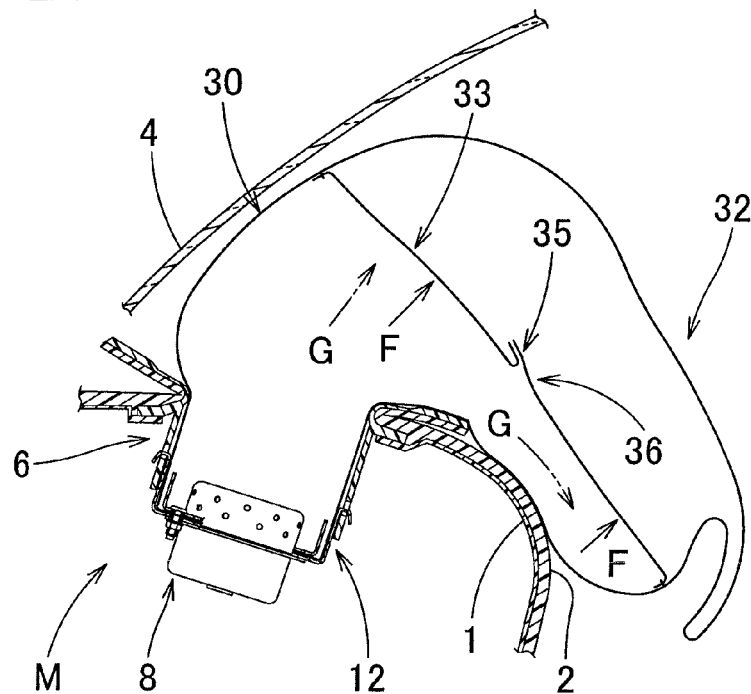
FIGS. 12A and 12B illustrate schematic views showing stages at which the airbag is inflated in the front passenger seat airbag apparatus of the embodiment, and illustrate a state after the stages in FIGS. 11A and 11B.
Figure 12B:
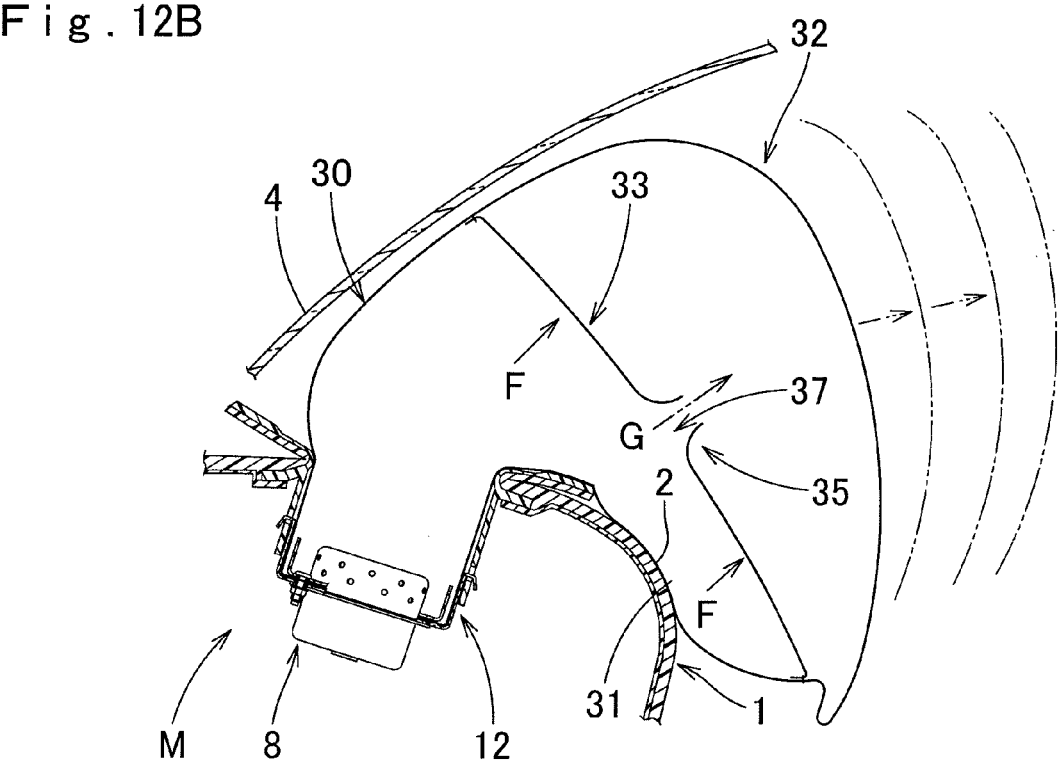
Figure 13A:
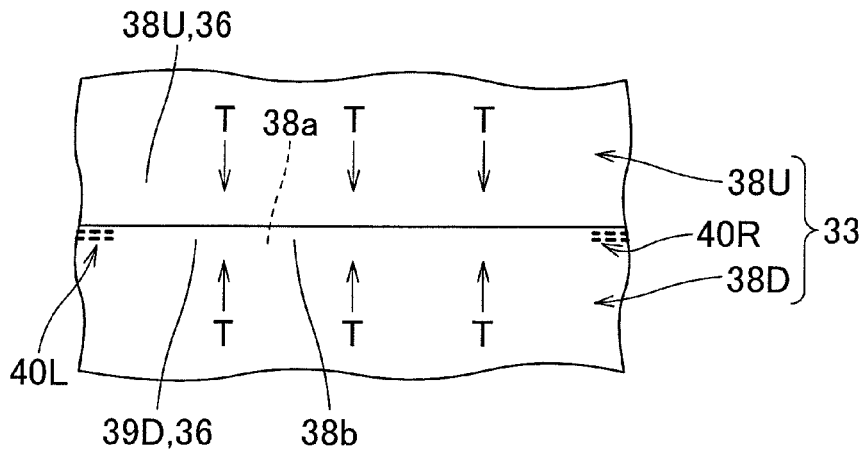
FIGS. 13A to 13C illustrate schematic views showing a state where a communication portion formed in a partition wall portion of the airbag is open in the front passenger seat airbag apparatus of the embodiment.
Figure 13B:
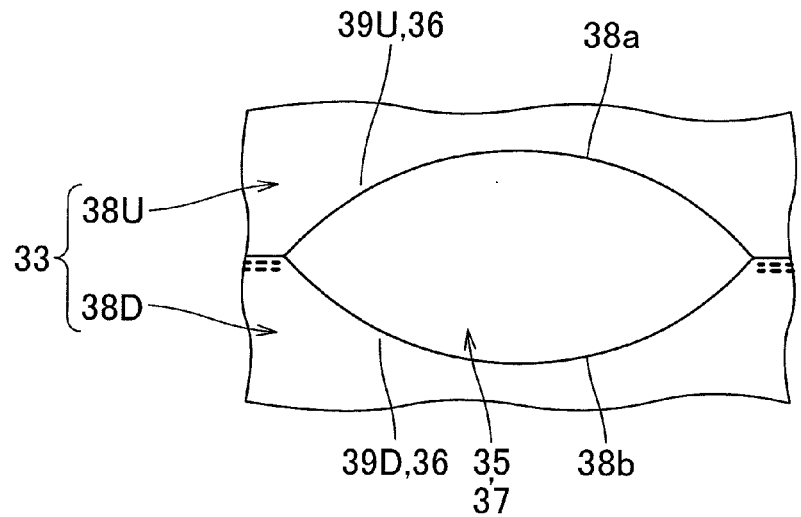
Figure 13C:
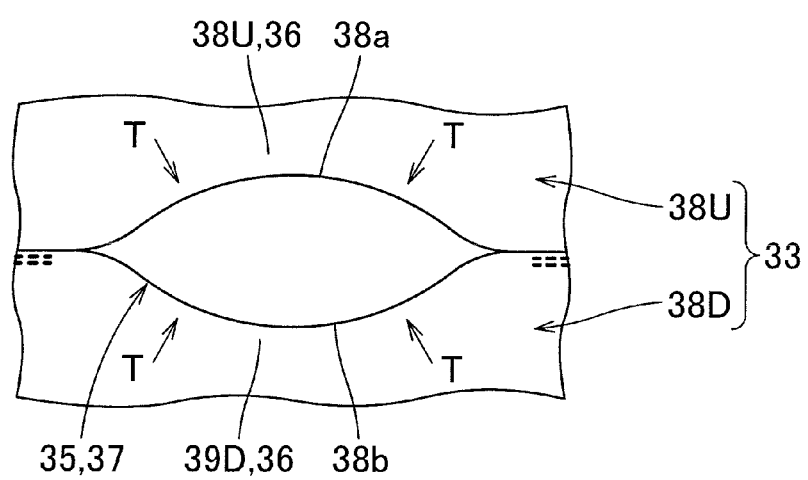

In the airbag apparatus M of the embodiment, the communication portion 35 formed in the partition wall portion 33 includes the flow rate control mechanism 36 that controls a flow rate of the inflation gas G discharged from the inflator 8. The flow rate control mechanism 36 suppresses a flow of the inflation gas G into the rear chamber 32 via the communication portion 35 at initial inflation of the airbag 15. For this reason, as illustrated in FIGS. 11A, 11B, and 12A, first, the inflation gas G discharged from the inflator 8 flows into the front chamber 30 at the initial inflation of the airbag 15, and thus the front chamber 30 is quickly inflated. When the front chamber 30 inflates to form an inflated shape substantially equivalent to a completely inflated shape of the airbag 15, and an internal pressure of the front chamber 30 starts increasing, as illustrated in FIG. 12B, the communication portion 35 is opened as the internal pressure of the front chamber 30 increases. Thereafter, the inflation gas G flows into the rear chamber 32 via the opening portion 37 formed in the communication portion 35, and thus the rear chamber 32 is inflated. The flow rate control mechanism 36 can increase or decrease the opening area of the communication portion 35 (the opening portion 37). Specifically, when the inflation gas G flows into the rear chamber 32, and thus the internal pressure of the front chamber 30 decreases, the flow rate control mechanism 36 can suppress a flow rate of the inflation gas G flowing into the rear chamber 32 by decreasing the opening area of the communication portion 35. For this reason, the internal pressure of the front chamber 30 can be prevented from greatly decreasing, and even when the inflation gas flows into the rear chamber 32, the front chamber 30 maintains the inflated shape. Furthermore, the front chamber 30 includes the supported portion 31 supported by the portion of the instrument panel 1, which becomes the circumferential edge of the case 12 (the accommodating portion) at the complete inflation of the airbag 15.

That is, in the airbag apparatus M of the embodiment, first, the inflation gas G flows into the front chamber 30 attached to the case 12, and thus the front chamber 30 is quickly inflated. The front chamber 30 maintains the inflated state even when the communication portion 35 is open and the rear chamber 32 is inflated. For this reason, the supported portion 31 is supported by the portion of the upper surface 2 of the instrument panel 1, which becomes the circumferential edge of the case 12 when the rear chamber 32 is inflated. As a result, even though the inflation gas flows into the rear chamber 32, and thus the rear chamber 32 once greatly protrudes to the rear, only the rear chamber 32 can primarily protrude to the rear. That is, in the airbag apparatus M of the embodiment, the entire airbag 15 does not protrude to the rear unlike the airbag of the related art, and thus the amount of protrusion to the rear is small. When the rear chamber 32 retracts to the front as a reaction to the protrusion of the rear chamber 32 to the rear, the supported portion 31 supported by the instrument panel 1 can prevent the rear chamber 32 from moving a great distance to the front. For this reason, the rear chamber 32 can be prevented from being inflated while oscillating considerably in the front and rear direction. Furthermore, the front chamber 30 maintains a substantially constant internal pressure until the complete inflation of the airbag 15 (until the complete inflation of the rear chamber 32), and the front chamber 30 maintains the inflated state. For this reason, the rear chamber 32 can be stably supported by the front chamber 30, from start to completion of the inflation, and the rear chamber 32 can be stably and quickly inflated. As a result, in the airbag apparatus M of the embodiment, even though the opening area at opening of the opening portion 37 of the communication portion 35 is large, and a great amount of the inflation gas G flows into the rear chamber 32, the supported portion 31 of the front chamber 30 maintaining the inflated state can be accurately supported by the instrument panel 1. When the airbag 15 is deployed and inflated, the protrusion of the airbag 15 to the rear can be suppressed, and the rear chamber 32 can be prevented from being inflated while oscillating considerably in the front and rear direction. For this reason, in the airbag apparatus M of the embodiment, the entire airbag 15 can be inflated in such a manner that the entire airbag 15 is quickly and stably disposed between the occupant and the instrument panel 1.

Accordingly, in the airbag apparatus M of the embodiment, the inflation of the airbag 15 can be quickly completed, and the occupant can be stably protected.

In the airbag apparatus M of the embodiment, the partition wall portion 33 is formed of the flexible base materials 38U and 38D for a partition wall in such a manner that the partition wall portion 33 and the communication portion 35 including the flow rate control mechanism 36 can be folded integrally with the outer circumferential wall (the circumferential wall portion 16 and the occupant-side wall portion 26) of the airbag 15. For this reason, the partition wall portion 33 can be smoothly and conveniently folded together with the airbag 15.

Furthermore, in the airbag apparatus M of the embodiment, when the airbag 15 at the complete inflation is seen from the side, the substantially entire outer circumferential edge 33a of the partition wall portion 33 is disposed to separate from the surface (the upper surface 2) of the instrument panel 1 as illustrated in FIG. 14. For this reason, the supported portion 31 of the front chamber 30 is supported by a wide region in every direction of the instrument panel 1, and even when the inflation gas flows into the rear chamber 32, the supported portion 31 can be more stably supported by the instrument panel 1. Alternatively, if such a point is not taken into consideration, the airbag may be configured to bring a part of the outer circumferential edge of the partition wall portion into contact with the instrument panel at the complete inflation of the airbag.

Furthermore, in the airbag apparatus M of the embodiment, when the airbag 15 at the complete inflation is seen from the side, the partition wall portion 33 slopes in the front and rear direction in such a manner that the upper end 33b faces the front and the lower end 33c thereof faces the rear (refer to FIG. 14). For this reason, the front chamber 30, the internal pressure of which increases at the initial inflation of the airbag 15, can be prevented from greatly interfering with the windshield 4 disposed above the instrument panel 1. In particular, in the airbag 15 at the complete inflation of the embodiment, the partition wall portion 33 is set to have a small slope angle in the front and rear direction in such a manner that the upper end 33b is positioned in the vicinity of the front end 17a of the upper wall portion 17 of the circumferential wall portion 16, and is positioned substantially right above the case 12. For this reason, at the initial inflation of the airbag 15, the front chamber 30 can be prevented from interfering with the windshield 4 most effectively. Alternatively, if such a point is not taken into consideration, the airbag at the complete inflation may be configured in such a manner that the partition wall portion is disposed at a slope angle along the substantially vertical direction, and that the front chamber is set to have a large region in the vertical direction.

Furthermore, in the airbag apparatus M of the embodiment, the flow rate control mechanism 36 is configured to have the circumferential edge portions 39U and 39D which are the respective circumferential edges of the communication portion 35 in the base materials 38U and 38D for a partition wall. The circumferential edge portions 39U and 39D are configured in such a manner that the opening portion 37 (the gap H) of the communication portion 35 is pulled in the closing direction by the tension T exerted on the surface of the outer circumferential wall (the circumferential wall portion 16 and the occupant-side wall portion 26) of the airbag 15 when the airbag 15 is deployed and inflated (refer to FIG. 13A). For this reason, at the initial inflation of the airbag 15, the inflation gas G flows into the front chamber 30 to increase the internal pressure thereof, and the front chamber 30 is inflated while the support on the supported portion 31 is ensured. Thereafter, as the internal pressure of the front chamber 30 increases, the pressure F to push the partition wall portion 33 outward exceeds the force which is caused to block the communication portion 35 by the tension T exerted on the surface of the partition wall portion 33. When the pressure F exceeds the tension T, first, the circumferential edge portions 39U and 39D of the communication portion 35 in the base materials 38U and 38D for a partition wall, which configures the flow rate control mechanism 36, separate from each other, and the opening portion 37 of the communication portion 35 is opened (refer to FIG. 13B). When the inflation gas G flows into the rear chamber 32 via the open communication portion 35, the internal pressure of the front chamber 30 decreases, and thus the pressure F to push the partition wall portion 33 outward decreases, and the communication portion 35 is pulled again in the closing direction by the tension T exerted on the surfaces of the circumferential edge portions 39U and 39D of the communication portion 35 in the base materials 38U and 38D for a partition wall. The opening portion 37 is opened in a state where the opening area thereof is narrowed (refer to FIG. 13C). The aforementioned processes are repeated, and thus the inflated state of the front chamber 30 is maintained, and the inflation of the rear chamber 32 is completed. For this reason, in the airbag apparatus M of the embodiment, an open state of the opening portion 37 of the communication portion 35 can be adjusted by the internal pressure of the front chamber 30 and the tension exerted on the surface of the partition wall portion 33. Even when the rear chamber 32 is inflated, the inflated state of the front chamber 30 can be maintained. As a result, with the aforementioned simple configuration, the inflation of the rear chamber 32 is not delayed (time to complete the inflation of the airbag 15 is not delayed), and the inflated state of the front chamber 30 can be accurately controlled. Alternatively, if such a point is not taken into consideration, the airbag may have a configuration in which a valve mechanism as the flow rate control mechanism is disposed in the communication portion.

In the airbag apparatus M of the embodiment, the preliminary folded airbag 55 is folded by the front to rear size reduction folding and the right to left size reduction folding so as to obtain the folded airbag 15. Here, the preliminary folded airbag 55 has the following configuration: The lower edge 38a and upper edge 38b of the base materials 38U and 38D for a partition wall of the communication portion 35 overlap so as to be in contact with each other in order for the gap H not to be widened, and are linearly disposed along the right and left direction. That is, in the embodiment, first, the preliminary folded airbag 55 undergoes the front to rear size reduction folding in which the preliminary folded airbag 55 is folded along the folding mark that is present along the right and left direction. For this reason, when the front to rear size reduction folding is performed, the communication portion 35 substantially linearly disposed in the right and left direction can be folded in such a manner that the respective lower edge 38a and upper edge 38b of the base materials 38U and 38D for a partition wall separate from each other (in such a manner that the gap H is widened) in a state where the folding is prevented from collapsing. As a result, in a state where the respective lower edge 38a and upper edge 38b of the base materials 38U and 38D for a partition wall of the communication portion 35 maintain the contact therebetween most effectively, the airbag 15 can be mounted on the vehicle. Accordingly, the communication portion 35 can be stably blocked at the initial inflation of the airbag 15.

In the airbag apparatus M of the embodiment, the partition wall portion 33 is configured to have the base materials 38U and 38D for a partition wall which are bisected in the vertical direction, and the communication portion 35 is disposed along the substantially right and left direction at the complete inflation of the airbag 15. However, the position of disposition of the communication portion or the shape of the partition wall portion is not limited to the embodiment. For example, the airbag may have a configuration in which the partition wall portion is formed of the materials for a partition wall that are bisected in the right and left direction, and in which the communication portion is disposed along the vertical direction at the complete inflation of the airbag. However, in terms of the good balanced airbag inflation in the right and left direction at the deployment and inflation of the airbag, as in the embodiment, the partition wall portion preferably has the configuration in which the communication portion is disposed along the substantially right and left direction at the complete inflation of the airbag.

The embodiment describes the top mount type front passenger seat airbag apparatus as an example. However, the front passenger seat airbag apparatus of the present invention is also applicable to a mid mount type front passenger seat airbag apparatus.

What is claimed is:

1. A front passenger seat airbag apparatus comprising:
    an airbag that is accommodated in a folded state in an accommodating portion disposed in an instrument panel in front of a front passenger seat of a vehicle; and
    an inflator that supplies inflation gas to the airbag,
    the airbag having a configuration in which a front-end side of the airbag is attached to the accommodating portion at complete inflation, the inflation gas discharged from the inflator flows into the airbag, and thus the airbag is deployed and inflated to protrude from the accommodating portion toward a rear side of the vehicle, and
    a partition wall portion is disposed in the airbag to partition an inner region of the airbag into a front chamber and a rear chamber at the complete inflation of the airbag, the partition wall portion including
        two sheets of flexible base materials for a partition wall that are placed in such a manner that corresponding edge portions of the base materials for a partition wall are aligned, and jointed, with each other to form a flow rate control mechanism, and
        an entire outer circumferential edge of the partition wall portion is jointed with an outer circumferential wall of the airbag, and the partition wall portion includes a communication portion formed as a substantially slit-shaped gap located within the flow rate control mechanism and located between jointed portions in which the edge portions of the base materials for a partition wall are jointed with each other, the communication portion communicating between the front chamber and the rear chamber, wherein
    the front chamber includes a supported portion supported by a portion which becomes a circumferential edge of the accommodating portion of the instrument panel at the complete inflation of the airbag,
    the flow rate control mechanism controls a flow rate of the inflation gas flowing from the front chamber into the rear chamber by increasing or decreasing an opening area of the communication portion, and
    the flow rate control mechanism is configured so that the communication portion is pulled in a closing direction by a tension exerted on a surface of the outer circumferential wall of the airbag when the airbag is deployed and inflated, is configured to suppress flow of the inflation gas into the rear chamber via the communication portion at initial inflation of the airbag in such a manner that the front chamber is inflated, and is configured to open the communication portion in such a manner that the inflation gas flows into the rear chamber by an internal pressure of the front chamber.

2. The front passenger seat airbag apparatus according to claim 1,
    wherein the partition wall portion is made of a flexible base material in such a manner that the partition wall portion can be folded with the communication portion including the flow rate control mechanism.

3. The front passenger seat airbag apparatus according to claim 1,
    wherein when the airbag at the complete inflation is seen from the side, the substantially entire outer circumferential edge of the partition wall portion is disposed to separate from a surface of the instrument panel.

4. The front passenger seat airbag apparatus according to claim 3,
    wherein when the airbag at the complete inflation is seen from the side, the partition wall portion is disposed to slope in a front and rear direction in such a manner that an upper-end side of the partition wall portion faces the front and a lower-end side thereof faces the rear.

5. The front passenger seat airbag apparatus according to claim 1,
    wherein the communication portion is disposed along a substantially right and left direction at the complete inflation of the airbag.

* * * * *